United States Patent [19]

Lamm

[11] 4,229,345
[45] Oct. 21, 1980

[54] (2-CHLORO-4-CYANOPHENYL) (4-DIALKYLAMINOPHENYL)-DIAZINE DYE USEFUL FOR TRANSFER PRINTING

[75] Inventor: Gunther Lamm, Hassloch, Fed. Rep. of Germany

[73] Assignee: BASF Aktiengesellschaft, Fed. Rep. of Germany

[21] Appl. No.: 846,817

[22] Filed: Oct. 31, 1977

Related U.S. Application Data

[63] Continuation of Ser. No. 643,108, Dec. 22, 1975, abandoned.

[30] Foreign Application Priority Data

Jan. 2, 1975 [DE] Fed. Rep. of Germany ....... 2500071

[51] Int. Cl.² .................. C09B 29/08; C09B 29/26; C09B 29/36; D06P 3/26
[52] U.S. Cl. ................. 260/205; 260/152; 260/206; 260/207; 260/207.1; 260/207.5
[58] Field of Search ............ 260/205, 206, 207, 207.1, 260/207.5

[56] References Cited

U.S. PATENT DOCUMENTS

3,637,651  1/1972  Baron et al. .................. 260/207

FOREIGN PATENT DOCUMENTS

1444196  12/1968  Fed. Rep. of Germany ........... 260/205
1090844  11/1957  United Kingdom ................ 260/207.1

Primary Examiner—Floyd D. Higel
Attorney, Agent, or Firm—Keil & Witherspoon

[57] ABSTRACT

Dyes useful for transfer printing and having the formula

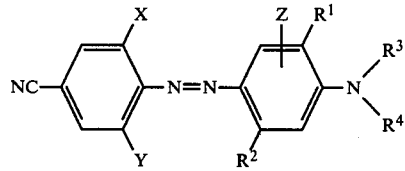

in which
X and Y are hydrogen or halogen,
Z is hydrogen or methyl,
$R^1$ is hydrogen, lower alkyl or alkoxy,
$R^2$ is hydrogen, chlorine, lower alkyl, alkoxy, alkanoylamino or pyrrolidonyl, and
$R^3$ and $R^4$ are alkyl optionally substituted by alkoxy, chlorine, alkanoyl or alkoxycarbonyl. The dyes are especially useful for the transfer printing of polyamides, giving prints having very good light and wet fastnesses.

7 Claims, No Drawings

(2-CHLORO-4-CYANOPHENYL) (4-DIALKYLAMINOPHENYL)-DIAZINE DYE USEFUL FOR TRANSFER PRINTING

This is a continuation, of application Ser. No. 643,108, filed Dec. 22, 1975, now abandoned.

The invention relates to the use of dyes of the formula (I):

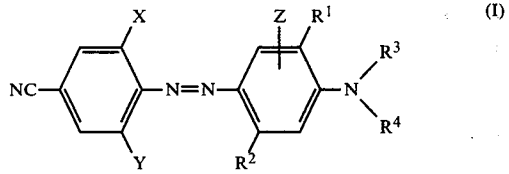

in which

X is hydrogen, chloro or bromo;
Y is hydrogen or chloro;
Z is hydrogen or methyl;
$R^1$ is hydrogen, $C_1$ to $C_4$ alkyl, methoxy or ethoxy;
$R^2$ is hydrogen, $C_1$ to $C_4$ alkyl, chloro, methoxy, ethoxy, $C_1$ to $C_4$ alkanoylamino which may bear chloro, methoxy or ethoxy as a substituent of

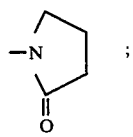

$R^3$ is allyl, methallyl, $C_1$ to $C_4$ alkyl, $C_1$ to $C_8$ alkanoyloxy-$C_2$- to $C_4$-alkyl optionaly bearing chloro, methoxy or ethoxy as a subtituent in the alkanoyl or $C_2$ to $C_4$ alkyl bearing chloro or $C_1$ to $C_8$ alkoxycarbonyl as a substituent; and $R^4$ is $C_1$ to $C_4$ alkyl, or $C_2$ to $C_4$ alkyl bearing $C_1$ to $C_4$ alkoxy or chloro as a substituent for transfer printing and also the new dyes.

The alkyl radical $R^1$ may be butyl, propyl or ethyl and particularly methyl.

Suitable radicals $R^2$, besides those already specified, are butyl, propyl, ethyl, formylamino, chloroacetylamino, methoxyacetylamino, ethoxyacetylamino and particularly methyl, acetylamino, propionylamino, n-butyrylamino or isobutyrylamino.

Examples of radicals $R^3$ are: methyl, butyl, hexoxyethyl, β-ethylhexoxyethyl, hexoxypropyl, β-ethylhexoxypropyl, methoxybutyl, ethoxybutyl, formyloxyethyl, formyloxypropyl, chloroacetoxyethyl, chloroacetoxypropyl, ethoxyacetoxyethyl, ethoxyacetoxypropyl, hexanoyloxyethyl, hexanoyloxypropyl, β-ethylhexanoyloxyethyl, βethylhexanoyloxypropyl, methoxycarbonylpropyl, ethoxycarbonylpropyl, propoxycarbonylpropyl, butoxycarbonylproyl, hexoxycarbonylethyl, hexoxycarbonylpropyl, β-ethylhexoxycarbonylethyl, β-ethylhexoxycarbonylpropyl and particularly ethyl, propyl, chloroethyl, methoxyethyl, methoxypropyl, ethoxyethyl, ethoxypropyl, n-propoxyethyl, isopropoxyethyl, n-propoxypropyl, isopropoxypropyl, acetoxyethyl, acetoxypropyl methoxyacetoxyethyl, methoxyacetoxypropyl, propionyloxyethyl, propionyloxypropyl, n-butyryloxyethyl, isobutyryloxyethyl, methoxycarbonylethyl, n-propoxycarbonylethyl, isopropoxycarbonylethyl, n-butoxycarbonylethyl, isobutoxycarbonylethyl or t-butoxycarbonylethyl.

Examples of radicals $R^4$ are: methyl, butyl and chloroethyl and particularly ethyl, propyl, methoxyethyl, ethoxyethyl, n-propoxyethyl, isopropoxyethyl, n-butoxyethyl, isobutoxyethyl, methoxypropyl, ethoxypropyl, n-propoxyypropyl, isopropoxyethyl, n-butoxypropyl and isobutoxypropyl.

Particular technical importance attaches to dyes of the formula (Ia):

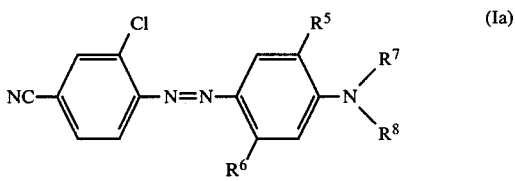

in which $R^5$ is hydrogen or methyl;
$R^6$ is hydrogen, methyl, ethyl or $C_2$ to $C_4$ alkanoylamino;
$R^7$ is $C_2$ to $C_4$ alkyl or $C_2$ to $C_3$ alkyl bearing $C_1$ to $C_4$ alkoxy, chloro, $C_2$ to $C_4$ alkanoylalkyl or $C_1$ to $C_4$ alkoxycarbonyl as a substituent; and
$R^8$ is $C_2$ to $C_4$ alkyl or $C_2$ to $C_4$ alkyl bearing $C_1$ to $C_4$ alkoxy as a substituent.

One group of preferred dyes in that of formula (Ia) in which $R^5$ is hydrogen and $R^6$ is $C_1$- to $C_4$- alkyl.

Methyl or ethyl is particularly preferred for $R^6$.

The dyes of formula (I) may be prepared by reacting a diazo compound of an amine of the formula (II):

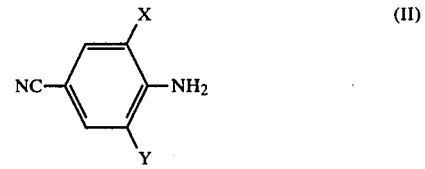

with a coupling component of the formula (III):

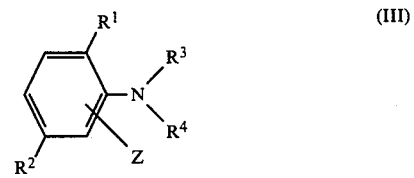

Dyes of the formula (I), some of which are new, are outstandingly suitable for transfer printing on substrates such as acrylonitrile polymers and preferably polyesters and polyamides.

For a long time there has been a demand for red dyes with which it is possible to obtain light-fast and wet-fast dyeings on polyamides by the transfer method. Light-fast red dyes transferable in particular onto polyamides have not hitherto been available. With the red compounds of the formula (I) it is possible to obtain on polyamides dyeings which are fast to both light and wet treatments and the wet fastness properties and the transferability can be preferentially influenced by the radicals $R^3$ and $R^4$. Radicals $R^3$ and $R^4$ preferably contain an ether oxygen atom or are preferably alkyl radicals.

Another group of preferred dyes in that of the formula (Ib)

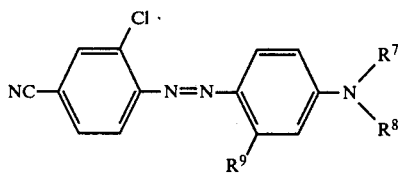

in which $R^9$ is $C_1$- to $C_4$-alkyl; $R^7$ is $C_2$- to $C_4$-alkyl, $C_1$- to $C_4$-alkoxy-$C_2$- to $C_3$-alkyl or $\beta$-chloroethyl; and $R^8$ is $C_2$- to $C_4$-alkyl or $C_1$- to $C_4$-alkoxy-$C_2$- to $C_4$-alkyl. In formula (Ib), methyl is particularly preferred for $R^9$.

Generally preferred dyes are those of the formula

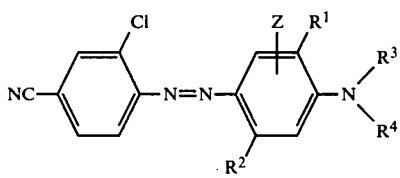

in which $R^1$ is hydrogen, $C_1$- to $C_4$-alkyl, methoxy or ethoxy, $R^2$ is hydrogen, chlorine or $C_1$- to $C_4$-alkyl, $R^3$ is $C_1$- to $C_4$-alkyl or $C_2$- to $C_4$-alkyl substituted by $C_1$- to $C_6$-alkoxy, chloro, $C_1$- to $C_4$-alkanoyl, chloroacetyl, chloropropionyl, methoxyacetyl, ethoxyacetyl or $C_1$- to $C_4$-alkoxycarbonyl, $R^4$ is $C_1$- to $C_6$-alkyl or $C_2$- to $C_4$-alkyl substituted by $C_1$- to $C_4$-alkoxy or chloro and Z is hydrogen or methyl. Those dyes of the formula (Ic) are especially preferred in which $R^1$ is hydrogen, $R^2$ is $C_1$- to $C_4$-alkyl, and $R^3$, $R^4$ and Z have the same meanings as given under formula (Ic).

Transfer printing processes are known for example from French Pat. No. 1,223,330 and German Laid-Open Specification (DOS) No. 1,769,757 and auxiliary carriers and printing inks therefor are known from German Laid-Open Specifications (DOS) Nos. 1,771,812 and 1,771,813.

The following Examples illustrate the invention; parts and percentages are by weight unless stated otherwise.

EXAMPLE 1

13.5 parts of 3-chloro-4-aminobenzonitrile is stirred with 120 parts by volume of glacial acetic acid, then 24 parts by volume of 30% hydrochloric acid is introduced and the mixture is cooled to 5° to 10° C. 20 parts of ice is added followed by 27 parts by volume of a 23% sodium nitrite solution and the diazotization mixture is stirred for two hours at from 4° to 6° C. Excess nitrous acid is then destroyed as usual with sulfamic acid and the mixture obtained is allowed to flow into a solution, cooled to 4° to 8° C., of 18.8 parts of the coupling component of the formula:

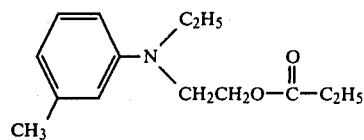

in 500 parts by volume of water and 8 parts by volume of 30% hydrochloric acid. The pH of the coupling mixture is then raised to 2.5 by adding 20% caustic soda solution (with simultaneous addition of 250 parts of ice for cooling). Coupling is rapidly over. The precipitated dye is filtered off, washed with water and dried. 30 parts of a red powder is obtained of the formula:

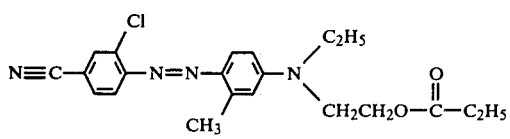

It dissolves in dimethylformamide with a red coloration. 6 parts of this powder is dispersed with 94 parts of a mixture consisting of 5 parts of ethylcellulose, 70 parts of ethyl alcohol, 20 parts of ethyl acetate and 5 parts of ethyl glycol. The dye paste obtained is printed onto transfer paper and dried. The printed side of the paper is contacted with a cloth of a polyester, polyamide or polyacrylonitrile and heated for thirty seconds at 190° to 200° C. A full, yellowish red dyeing having good light and wet fastness properties is thus obtained on the cloth.

EXAMPLE 2

9.6 parts of 4-aminobenzonitrile is dispersed with 160 parts by volume of water and 24 parts by volume of 30% hydrochloric acid. 160 parts of ice and 27 parts by volume of a 23% solution of sodium nitrite are then added, the mixture is stirred for two hours at 0° to 5° C. and then excess nitrous acid is destroyed in the usual way. 18.8 parts of the coupling component of the formula:

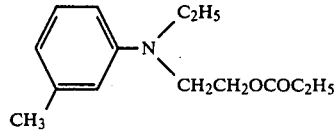

which has been dissolved in 500 parts by volume of water and 8 parts by volume of 30% hydrochloric acid is then allowed to flow in and the whole is cooled to 0° to 8° C. by adding 250 parts of ice. Coupling is rapidly completed after the pH has been raised to 2.5 with caustic soda solution or sodium acetate. The precipitate deposited is filtered off, washed with water and dried. 28 parts of a reddish brown powder is obtained. In solution the color is orange. The formula of the compound is:

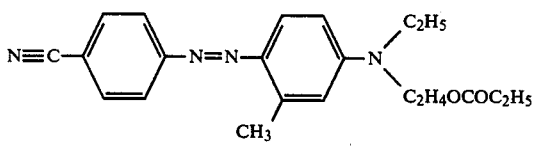

A colored ink consisting of 100 parts of this dye, 400 parts of locust bean ether gum, 200 parts of starch ether and 300 parts of water is applied to transfer paper and dried. Cloth of polyethylene terephthalate or polyamide or a mixture of the two synthetic fibers is pressed onto the printed side of the paper and the paper is heated for thirty seconds at from 190° to 200° C. A full orange dyeing of the synthetic fibers is obtained in this way. The dyeing has good wet and light fastness properties.

Dyes characterized in the following Tables by specifying the substituents and the hue of the dyeing may be prepared and applied to the material to be dyed by analogous methods.

TABLE 1

$$N\equiv C-\underset{}{\underset{}{\bigcirc}}\underset{Cl}{}-N=N-\underset{R^2}{\underset{}{\bigcirc}}\underset{R^1}{-}N\underset{R^4}{\overset{R^3}{\diagup}}$$

| No. | R¹ | R² | R³ | R⁴ | Hue |
|---|---|---|---|---|---|
| 3 | H | CH₃ | C₂H₅ | CH₂CH₂OCH₃ | yellowish red |
| 4 | " | " | " | CH₂CH₂CH₂OCH₃ | red |
| 5 | " | " | " | CH₂CHOCH₃<br>\|<br>CH₃ | " |
| 6 | " | " | " | CHCH₂OCH₃<br>\|<br>CH₃ | " |
| 7 | " | " | " | CH₂CH₂OCH(CH₃)₂ | yellowish red |
| 8 | " | " | " | CH₂CH₂OC₂H₅ | " |
| 9 | " | " | " | CH₂CH₂OC₃H₇(n) | " |
| 10 | " | " | " | CH₂CH₂OC₄H₉(n) | " |
| 11 | " | " | CH₂CH₂OCH₃ | CH₂CH₂OCH₃ | reddish orange |
| 12 | " | " | C₃H₇(n) | CH₂CH₂OCH₃ | yellowish red |
| 13 | " | C₂H₅ | C₂H₅ | CH₂CH₂OCH₃ | " |
| 14 | " | CH₃ | " | CH₂CH₂OCOCH₃ | " |
| 15 | " | " | " | CH₂CH₂OCOC₃H₇(n) | " |
| 16 | " | " | " | CH₂CH₂OCOC₃H₇(i) | " |
| 17 | " | " | C₃H₇(n) | CH₂CH₂OCOCH₃ | " |
| 18 | " | " | " | CH₂CH₂OCOC₂H₅ | " |
| 19 | " | H | C₄H₉(n) | CH₂CH₂OCOCH₃ | orange |
| 20 | " | " | C₂H₅ | C₂H₅ | " |
| 21 | " | " | " | CH₂CH₂OCOC₂H₅ | " |
| 22 | " | CH₃ | " | CH₂CH₂OC₂H₅ | red |
| 23 | " | H | " | CH₂CH₂OCOCH₂CHC₄H₉(n)<br>\|<br>C₂H₅ | orange |
| 24 | " | " | " | CH₂CH₂COOC₂H₅ | " |
| 25 | " | " | " | CH₂CH₂COOCH₃ | " |
| 26 | " | " | " | CH₂CH₂COOC₃H₇(i) | " |
| 27 | " | " | " | CH₂CH₂COOC₆H₁₃(n) | " |
| 28 | " | CH₃ | " | CH₂CH₂COOC₆H₁₃(n) | yellowish red |
| 29 | " | " | " | CH₂CH₂COOCH₃ | " |
| 30 | " | " | " | CH₂CH₂COOC₂H₅ | " |
| 31 | " | " | " | CH₂CH₂COOC₃H₇(n) | " |
| 32 | " | " | " | CH₂CH₂COOC₃H₇(i) | " |
| 33 | " | " | " | CH₂CH₂COOC₄H₉(n) | " |
| 34 | " | " | " | CH₂CH₂COOC₄H₉(i) | " |
| 35 | " | " | " | CH₂CH₂COOC₄H₉(t) | " |
| 36 | CH₃ | " | " | CH₂CH₂COOCH₃ | brownish red |
| 37 | " | " | " | CH₂CH₂COOC₂H₅ | " |
| 38 | " | " | " | CH₂CH₂COOC₃H₇(i) | " |
| 39 | " | " | CH₂CH₂OCH₃ | CH₂CH₂COOC₃H₇(i) | " |
| 40 | " | " | CH₂CH₂OCH(CH₃)₂ | CH₂CH₂COOCH₃ | " |
| 41 | " | " | C₂H₅ | CH₂CH₂OCH(CH₃)₂ | " |
| 42 | " | " | " | CH₂CH₂OCOCH₃ | " |
| 43 | " | " | " | CH₂CH₂OCOC₂H₅ | " |
| 44 | " | " | " | CH₂CH₂OCOC₃H₇(i) | " |
| 45 | " | " | " | CH₂CHOCOCH₃<br>\|<br>CH₃ | " |
| 46 | " | " | " | CH₂CH₂OCH₃ | " |
| 47 | " | " | C₂H₅ | CH₂CH₂OC₂H₅ | " |
| 48 | " | H | " | CH₂CH₂OC₂H₅ | orange red |
| 49 | " | " | " | CH₂CH₂OCH₃ | " |
| 50 | " | " | " | CH₂CH₂OCH(CH₃)₂ | " |
| 51 | " | " | " | CH₂CH₂OCOCH₃ | " |
| 52 | " | " | " | CH₂CH₂OCOC₂H₅ | " |
| 53 | " | " | " | CH₂CH₂OCOC₃H₇(n) | " |
| 54 | " | " | " | CH₂CH₂OCOC₃H₇(i) | " |
| 55 | " | " | " | CH₂CH₂COOCH₃ | " |

TABLE 1-continued

Structure: N≡C—(3-Cl-phenyl)—N=N—(phenyl with R¹, R², and NR³R⁴ substituents)

| No. | R¹ | R² | R³ | R⁴ | Hue |
|---|---|---|---|---|---|
| 56 | " | " | " | $CH_2CH_2COOC_2H_5$ | " |
| 57 | " | " | " | $CH_2CH_2COOC_3H_{7(n)}$ | " |
| 58 | " | " | " | $CH_2CH_2OC_2H_5$ | " |
| 59 | H | " | " | $CH_2CH_2OC_2H_5$ | orange |
| 60 | " | " | " | $CH_2CH_2OCH_3$ | " |
| 61 | " | " | $C_4H_{9(n)}$ | $CH_2CH_2OCH_3$ | " |
| 62 | $C_2H_5$ | " | $C_2H_5$ | $CH_2CH_2OCOCH_3$ | brownish red |
| 63 | " | " | " | $CH_2CH_2OCOC_2H_5$ | " |
| 64 | H | $C_2H_5$ | " | $CH_2CH_2OCOC_2H_5$ | reddish orange |
| 65 | " | " | " | $CH_2CH_2COOCH_3$ | " |
| 66 | " | Cl | " | $C_2H_5$ | orange |
| 67 | $CH_3$ | " | " | $C_2H_5$ | " |
| 68 | H | $CH_3$ | " | $CH_2CH_2OCH_2CHC_4H_{9(n)}$<br>                            $\|$<br>                            $C_2H_5$ | red |
| 69 | $OCH_3$ | H | " | $C_2H_5$ | " |
| 70 | " | " | $C_3H_{7(n)}$ | $C_3H_{7(n)}$ | " |
| 71 | H | $OCH_3$ | $C_2H_5$ | $C_2H_5$ | " |
| 72 | " | " | $C_3H_{7(n)}$ | $C_3H_{7(n)}$ | " |
| 73 | " | " | $CH_2CH_2OCH_3$ | $C_2H_5$ | " |
| 74 | " | " | $C_2H_5$ | $CH_2CH_2OCOC_2H_5$ | " |
| 75 | " | " | " | $CH_2CH_2COOC_2H_5$ | " |
| 76 | $CH_3$ | $CH_3$ | $CH_2CH_2OCH_3$ | $CH_2CH_2OCOC_2H_5$ | " |
| 77 | " | " | " | $CH_2CH_2OCOC_3H_{7(i)}$ | " |
| 78 | H | " | " | $CH_2CH_2OCOC_3H_{7(i)}$ | yellowish red |
| 79 | " | " | $CH_2CH_2CH_2CH_2OCOCH_3$ | $CH_2CH_2CH_2COOCH_3$ | red |

TABLE 2

Structure: N≡C—(phenyl with X, Y)—N=N—(phenyl with R², Z, NR³R⁴)

| No. | X | Y | Z | R² | R³ | R⁴ | Hue |
|---|---|---|---|---|---|---|---|
| 80 | H | H | H | H | $C_2H_5$ | $C_2H_4OCOCH_3$ | orange |
| 81 | " | " | " | " | " | $CH_2CH_2COOC_2H_5$ | " |
| 82 | " | Cl | " | " | " | $CH_2CH_2COOC_2H_5$ | " |
| 83 | Cl | " | " | " | " | $C_2H_4OCOC_2H_5$ | red |
| 84 | " | Cl | " | $CH_3$ | " | $C_2H_4OCOC_2H_5$ | " |
| 85 | H | H | " | $NHCOCH_3$ | " | $C_2H_5$ | orange |
| 86 | " | " | " | " | $C_3H_{7(n)}$ | $C_3H_{7(n)}$ | " |
| 87 | Cl | " | " | " | " | " | red |
| 88 | " | " | " | " | $C_2H_5$ | $C_2H_5$ | " |
| 89 | Br | " | " | $CH_3$ | $C_2H_5$ | $CH_2CH_2OCOC_3H_{7(i)}$ | " |
| 90 | Cl | " | $CH_3$ | " | " | $CH_2CH_2OCH_3$ | " |
| 91 | " | " | " | " | " | $CH_2CH_2OCOCH_3$ | " |
| 92 | " | " | " | " | " | $CH_2CH_2OCOC_2H_5$ | " |
| 93 | " | " | " | " | " | $CH_2CH_2COOC_2H_5$ | " |
| 94 | " | " | H | $NH-COC_2H_5$ | " | $C_2H_5$ | " |
| 95 | " | " | " | $NHCOC_3H_{7(n)}$ | " | " | " |
| 96 | " | " | " | pyrrolidinone-N- | " | " | " |
| 97 | H | " | " | $CH_3$ | " | " | orange |
| 98 | " | " | " | $C_2H_5$ | " | " | " |
| 99 | " | " | " | $OCH_3$ | " | " | yellowish red |
| 100 | " | " | " | $CH_3$ | " | $CH_2CH_2OCOCH_3$ | orange |
| 101 | " | " | " | " | " | $CH_2CH_2OCOC_2H_5$ | " |
| 102 | " | " | " | " | " | $CH_2CH_2OCOC_3H_{7(n)}$ | " |
| 103 | " | " | $CH_3$ | " | $CH_2CH_2OCH_3$ | " | " |
| 104 | " | " | " | " | " | $CH_2CH_2OCOC_2H_5$ | " |
| 105 | " | " | " | " | " | $CH_2CH_2COOCH_3$ | " |
| 106 | " | " | " | " | " | $CH_2CH_2COOC_2H_5$ | " |
| 107 | " | " | " | " | $CH_2CH_2OCH(CH_3)_2$ | $CH_2CH_2COOCH_3$ | " |
| 108 | Cl | " | " | " | $CH_2CH_2OCH_3$ | " | red |
| 109 | " | " | " | " | " | $CH_2CH_2COOC_2H_5$ | " |
| 110 | " | " | H | $NHCOCH_2OCH_3$ | $C_2H_5$ | $C_2H_5$ | " |

TABLE 2-continued structure:
N≡C—[benzene with X, Y]—N=N—[benzene with R², Z]—N(R³)(R⁴)

| No. | X | Y | Z | R² | R³ | R⁴ | Hue |
|---|---|---|---|---|---|---|---|
| 111 | " | " | " | NHCOCH₂OC₂H₅ | " | " | " |
| 112 | " | " | " | CH₃ | CH₂CH=CH₂ | " | " |
| 113 | " | " | " | " | " | CH₂CH₂COOC₂H₅ | " |
| 114 | " | " | " | NHCOC₂H₅ | C₂H₅ | C₂H₅ | " |
| 115 | " | " | " | NHCOCH(CH₃)₂ | " | " | " |
| 116 | " | " | " | NHCOC₂H₅ | C₂H₄Cl | C₂H₄Cl | " |

TABLE 3 structure:
N≡C—[benzene with Cl]—N=N—[benzene with R¹, R²]—N(R³)(R⁴)

| No. | R¹ | R² | R³ | R⁴ | Hue |
|---|---|---|---|---|---|
| 117 | OCH₃ | CH₃ | C₂H₅ | CH₂CH₂OCOC₂H₅ | bluish red |
| 118 | " | " | " | CH₂CH₂OCOCH₃ | " |
| 119 | " | " | C₃H₇(n) | " | " |
| 120 | " | " | C₄H₉(n) | " | " |
| 121 | OC₂H₅ | H | C₂H₅ | CH₂CH₂OCH₃ | red |
| 122 | H | OC₂H₅ | " | " | " |
| 123 | " | " | " | C₂H₅ | " |
| 124 | " | H | " | C₂H₄Cl | orange |
| 125 | " | CH₃ | " | " | reddish orange |
| 126 | " | " | CH₂CH₂OCH₃ | " | " |
| 127 | CH₃ | " | " | " | brownish red |
| 128 | H | " | C₂H₅ | CH₂CH₂OC₃H₇(n) | red |
| 129 | " | " | " | CH₂CH₂OC₃H₇(i) | " |
| 130 | " | " | " | CH₂CH₂OC₄H₉(n) | " |
| 131 | " | " | C₃H₇(n) | " | " |
| 132 | " | " | " | CH₂CH₂OC₃H₇(i) | " |
| 133 | " | " | " | CH₂CH₂OC₃H₇(n) | " |
| 134 | " | " | " | CH₂CH₂OC₂H₅ | " |
| 135 | " | " | " | C₃H₇(n) | " |
| 136 | " | " | C₄H₉(n) | C₄H₉(n) | " |
| 137 | " | " | " | C₄H₉(i) | " |
| 138 | " | C₂H₅ | C₂H₅ | C₂H₅ | " |
| 139 | " | " | C₃H₇(n) | C₃H₇(n) | " |
| 140 | " | C₃H₇(n) | C₂H₅ | C₂H₅ | " |

I claim:
1. A dye of the formula

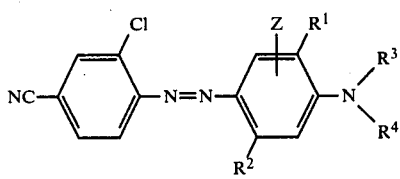

in which
R¹ is hydrogen,
R² is C₁- to C₄-alkyl,
R³ is C₁- to C₄-alkyl or C₂- to C₄-alkyl substituted by C₁- to C₆-alkoxy, C₁- to C₄-alkanoyl, chloroacetyl, chloropropionyl, methoxyacetyl, ethoxyacetyl or C₁- to C₄-alkoxycarbonyl,
R⁴ is C₁- to C₆-alkyl or C₂- to C₄-alkyl substituted by C₁- to C₄-alkoxy and Z is hydrogen or methyl.

2. A dye according to claim 1 of the formula

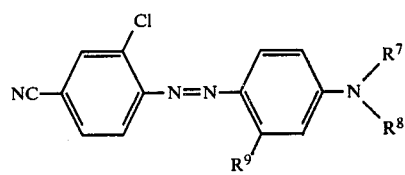

in which
R⁹ is C₁- to C₄-alkyl,
R⁷ is C₂- to C₄-alkyl or C₁- to C₄-alkoxy-C₂- or C₃-alkyl and
R⁸ is C₂- to C₄-alkyl or C₁- to C₄-alkoxy-C₂- to C₄-alkyl.

3. A dye according to claim 2 of the formula

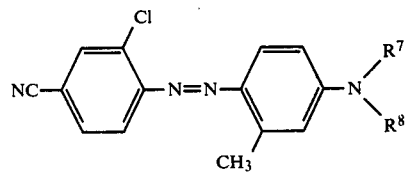

in which
R⁷ and R⁸ have the meanings given for claim 2.
4. The dye according to claim 1 of the formula
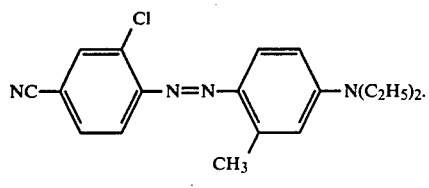
5. The dye according to claim 1 of the formula
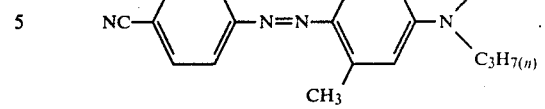
6. The dye according to claim 1 of the formula
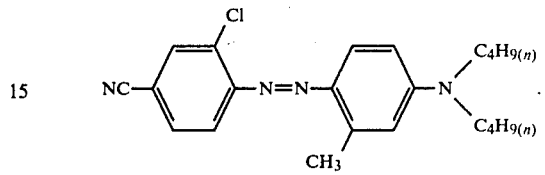
7. The dye according to claim 1 of the formula
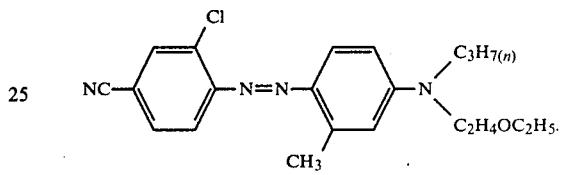
* * * * *